UNITED STATES PATENT OFFICE.

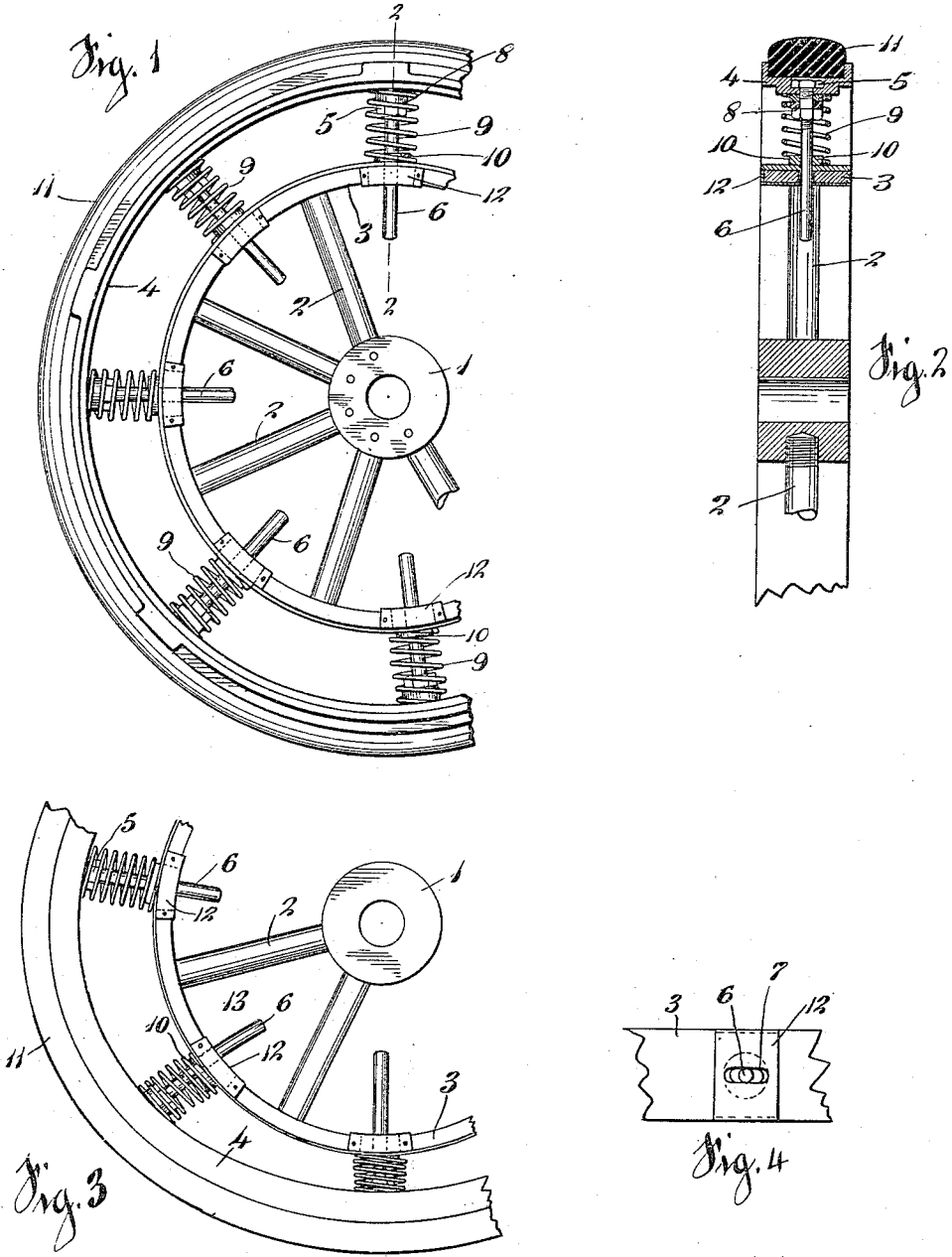

COURT SIMONTON AND GEORGE WASHINGTON MAPHET, OF CINCINNATI, OHIO.

VEHICLE-WHEEL.

1,244,554. Specification of Letters Patent. Patented Oct. 30, 1917.

Application filed March 29, 1917. Serial No. 158,380.

*To all whom it may concern:*

Be it known that we, COURT SIMONTON and GEORGE WASHINGTON MAPHET, citizens of the United States, residing in the city of Cincinnati, county of Hamilton, and State of Ohio, have jointly invented certain new and useful Improvements in Vehicle-Wheels, of which the following is the specification.

Our invention relates to vehicle wheels, particularly to resilient wheels such as are adapted for use on motor vehicles.

One object of our invention is to produce a resilient vehicle wheel of simple, inexpensive and efficient construction.

Other objects of our invention will be apparent from the following specification thereof taken in connection with the accompanying drawings, in the several figures of which like numerals indicate like parts.

In the drawings:

Figure 1 is a side elevation of a portion of a vehicle wheel embodying our invention.

Fig. 2 is a section on line 2—2 of Fig. 1.

Fig. 3 is a side elevation of said wheel under pressure or weight; and

Fig. 4 is a detail.

The numeral 1 indicates the hub and 2 the spokes of a wheel, the same being of any ordinary and suitable construction. Secured to the spokes is a felly 3. Concentric with the felly is rim 4, said rim being of resilient construction. Secured to the rim by means of lock nuts 5 are flexible or resilient rods 6, the same passing through slots 7 in the felly wherein they are permitted to reciprocate and also to move circumferentially. Interposed between the rim and the inner lock nuts 5 are compressible washers 8 which prevent the bending of the rods 6 at too sharp an angle. Around each of the rods 6 and interposed between the rim and felly are coil springs 9 the same being under compression and being prevented from lateral movement on the felly by means of circular lugs or collars 10 on said felly.

In order to protect the edges of the slots 7 in the felly, we have secured to said felly, plates 12 provided with slots arranged to register with the interior openings of the slots in the wheel.

The operation of our new vehicle wheel will be apparent to those skilled in the art from the foregoing description thereof. When the wheel is under load, in which position it is shown in Fig. 3 of the drawings, the rim assumes an elliptical form, the top and bottom thereof being somewhat flattened and the coil springs at such points being under compression. In both directions from the vertical diameter, both at the top and bottom of the wheel, the compression of the rim and the coil springs progressively decreases until at points on and near the horizontal diameter the resilient rim and coil springs are distended. The rods 6 on the vertical and horizontal diameters are in normal position, that is, straight. Those not on these diameters are compelled to move circumferentially by the movement of the resilient rim and are then somewhat bent as shown at 13 in Fig. 3. It will be understood of course, that the various flexible and operating members thus described pass continuously, during the operation of the wheel through a cycle of movements and flexions corresponding to and indicated by the typical positions above described. It will be noted that a wheel constructed as above set forth comprises a high degree of resilience together with extreme simplicity in construction. Numeral 11 indicates hard rubber tire in exterior felly.

Having thus described our invention, what we claim as new and desire to secure by Letters Patent is:

1. In a vehicle wheel, a resilient rim normally substantially circular, but adapted to be flexed into elliptical form, a rigid interior part comprising the hub of the wheel normally concentric with said rim, resilient rods secured to said rim at intervals therearound to normally extend radially inwardly, said interior part having peripheral openings receiving said rods, and springs compressed between said rim and said interior part at intervals therearound, whereby said interior part moves down from its normal relation with said rim partly by compression of some of said springs, partly by yielding of said resilient rods, and partly by flexure of said rim.

2. In a vehicle wheel, a resilient rim normally substantially circular, but adapted to be flexed into elliptical form, a rigid interior part comprising the hub of the wheel normally concentric with said rim, resilient rods, and nuts securing respective ones of said rods to said rim at intervals therearound to normally extend radially inwardly, said interior part having peripheral openings receiving said rods, springs compressed between said rim and said interior part at intervals therearound, whereby said interior part moves down from its normal relation with said rim partly by compression of some of said springs and partly by flexure of said rim, and resilient washers interposed between said nuts and said rim to allow said resilient rods to leave their normal positions partly by bodily movement and partly by flexure.

In testimony whereof we have hereunto set our hands in the presence of the two subscribing witnesses.

COURT SIMONTON.
GEORGE WASHINGTON MAPHET.

Witnesses:
JOHN W. MATTHEWS,
BLANCHE E. PACE.

Copies of this patent may be obtained for five cents each, by addressing the "Commissioner of Patents, Washington, D. C."